US011904558B2

(12) United States Patent
Velasquez et al.

(10) Patent No.: US 11,904,558 B2
(45) Date of Patent: Feb. 20, 2024

(54) PLACEMENT AND COMPACTION OF MULTIPLE OBJECTS VIA VACUUM HEADS WITH FLOATING END EFFECTORS

(71) Applicant: The Boeing Company, Chicago, IL (US)

(72) Inventors: Luis Velasquez, Ladson, SC (US); Allen James Halbritter, Summerville, SC (US)

(73) Assignee: The Boeing Company, Chicago, IL (US)

( * ) Notice: Subject to any disclaimer, the term of this patent is extended or adjusted under 35 U.S.C. 154(b) by 309 days.

(21) Appl. No.: 17/472,942

(22) Filed: Sep. 13, 2021

(65) Prior Publication Data
US 2022/0111604 A1 Apr. 14, 2022

Related U.S. Application Data

(60) Provisional application No. 63/089,846, filed on Oct. 9, 2020.

(51) Int. Cl.
*B29C 70/00* (2006.01)
*B29C 70/30* (2006.01)
(Continued)

(52) U.S. Cl.
CPC .......... *B29C 70/30* (2013.01); *B25J 9/1602* (2013.01); *B25J 15/0616* (2013.01);
(Continued)

(58) Field of Classification Search
CPC ......... B29C 70/30; B29C 70/54; B29C 31/08; B25J 9/1602; B25J 15/0616;
(Continued)

(56) References Cited

U.S. PATENT DOCUMENTS 3,019,130 A * 1/1962 Hornbostel ............ D21H 25/08
427/296
3,507,728 A * 4/1970 Bock ........................ E04C 2/32
156/196

(Continued)

FOREIGN PATENT DOCUMENTS

CN          102741040 A      10/2012
CN          105109058 A  *  12/2015
(Continued)

OTHER PUBLICATIONS

Chinese Office action; Application 201810479529.4; dated Feb. 8, 2022.
(Continued)

*Primary Examiner* — Peter D Nolan
*Assistant Examiner* — Peter Y Ning
(74) *Attorney, Agent, or Firm* — Duft & Bornsen, PC

(57) ABSTRACT

Systems and methods are provided for handling objects. One embodiment is an apparatus for handling objects. The apparatus includes a vacuum securement head. The vacuum securement head includes a strongback, and an array of end effectors arranged at the strongback in conformance with a contour. The contour is complementary to a pickup tool. The array of end effectors is configured to pickup objects at the pickup tool. The vacuum securement head also includes an impermeable membrane that is penetrated by the end effectors, and a vacuum system configured to provide suction through the end effectors. The suction is configured to remove air between the impermeable membrane and a rigid tool, and offset air leaks between the impermeable membrane and the rigid tool.

20 Claims, 13 Drawing Sheets

(51) Int. Cl.
  *B25J 9/16* (2006.01)
  *B25J 15/06* (2006.01)
  *B29C 70/54* (2006.01)
  B29L 31/30 (2006.01)
  *B64F 5/10* (2017.01)

(52) U.S. Cl.
  CPC ....... *B29C 70/54* (2013.01); *B29L 2031/3076* (2013.01); *B64F 5/10* (2017.01); *G05B 2219/39001* (2013.01); *G05B 2219/39558* (2013.01)

(58) Field of Classification Search
  CPC ............... B29L 2031/3076; B64F 5/10; G05B 2219/39001; G05B 2219/39558
  See application file for complete search history.

(56) References Cited

U.S. PATENT DOCUMENTS

| | | | | |
|---|---|---|---|---|
| 3,944,045 | A * | 3/1976 | Higgins | B65B 9/135 198/340 |
| 4,475,976 | A * | 10/1984 | Mittelstadt | B29C 70/541 425/389 |
| 4,589,247 | A * | 5/1986 | Tsuruta | B65B 9/213 53/550 |
| 5,427,518 | A * | 6/1995 | Morizot | B29C 70/38 100/211 |
| 5,564,553 | A * | 10/1996 | Spletzer | A41H 43/02 198/429 |
| 10,464,268 | B2 | 11/2019 | Waldrop, III | B29C 48/08 |
| 10,532,828 | B2 | 1/2020 | Halbritter | B29C 31/08 |
| 10,926,435 | B2 * | 2/2021 | Heath | B29D 99/0003 |
| 11,097,524 | B2 | 8/2021 | Halbritter | B29C 70/44 |
| 2007/0284046 | A1 * | 12/2007 | Habisreitinger | B65B 33/04 156/352 |
| 2011/0118683 | A1 * | 5/2011 | Weston | A61M 1/732 604/319 |
| 2013/0036922 | A1 * | 2/2013 | Stewart | B30B 5/02 100/211 |
| 2013/0153140 | A1 * | 6/2013 | Gonz Lez Fern Ndez | B32B 37/1009 156/248 |
| 2014/0061962 | A1 * | 3/2014 | Lane | B29C 70/54 264/40.3 |
| 2014/0237793 | A1 * | 8/2014 | Gamboa | F16B 47/00 403/33 |
| 2015/0273809 | A1 * | 10/2015 | Thomas | B29C 70/44 156/580 |
| 2015/0367550 | A1 * | 12/2015 | Luepke | B64F 5/10 264/40.5 |
| 2017/0050393 | A1 * | 2/2017 | Duclos | B29C 70/44 |
| 2017/0129195 | A1 * | 5/2017 | Stephenson | B33Y 10/00 |
| 2019/0308356 | A1 * | 10/2019 | Cai | B29C 48/92 |
| 2021/0094240 | A1 * | 4/2021 | Fleming | B29C 70/549 |
| 2021/0107169 | A1 * | 4/2021 | Velasquez | B29C 31/08 |
| 2021/0268753 | A1 * | 9/2021 | Schibsbye | B29C 70/544 |
| 2021/0276285 | A1 * | 9/2021 | Heath | B29C 70/446 |

FOREIGN PATENT DOCUMENTS

| | | | | |
|---|---|---|---|---|
| CN | 105109058 | A | 12/2015 | |
| CN | 106239935 | A * | 12/2016 | |
| CN | 106239935 | A | 12/2016 | |
| CN | 106671444 | A | 5/2017 | |
| EP | 0917920 | A2 * | 5/1999 | |
| EP | 2452806 | B1 * | 7/2014 | ............. B29C 70/30 |
| EP | 3741544 | A1 * | 11/2020 | ............ B29B 15/125 |
| EP | 3878639 | A2 * | 9/2021 | ............. B29C 43/12 |
| EP | 4035876 | A1 * | 8/2022 | .......... B25J 15/0066 |
| JP | H01214412 | A * | 8/1989 | |
| JP | 2014091271 | A * | 5/2014 | |
| JP | 2014091271 | A | 5/2014 | |
| WO | WO-2021263109 | A1 * | 12/2021 | .......... B25J 15/0023 |

OTHER PUBLICATIONS

Chinese Office action; Application 202011047578.4; dated Sep. 5, 2023.

Chinese Notice of Allowance; Application 201810479529.4; dated May 31, 2022.

* cited by examiner

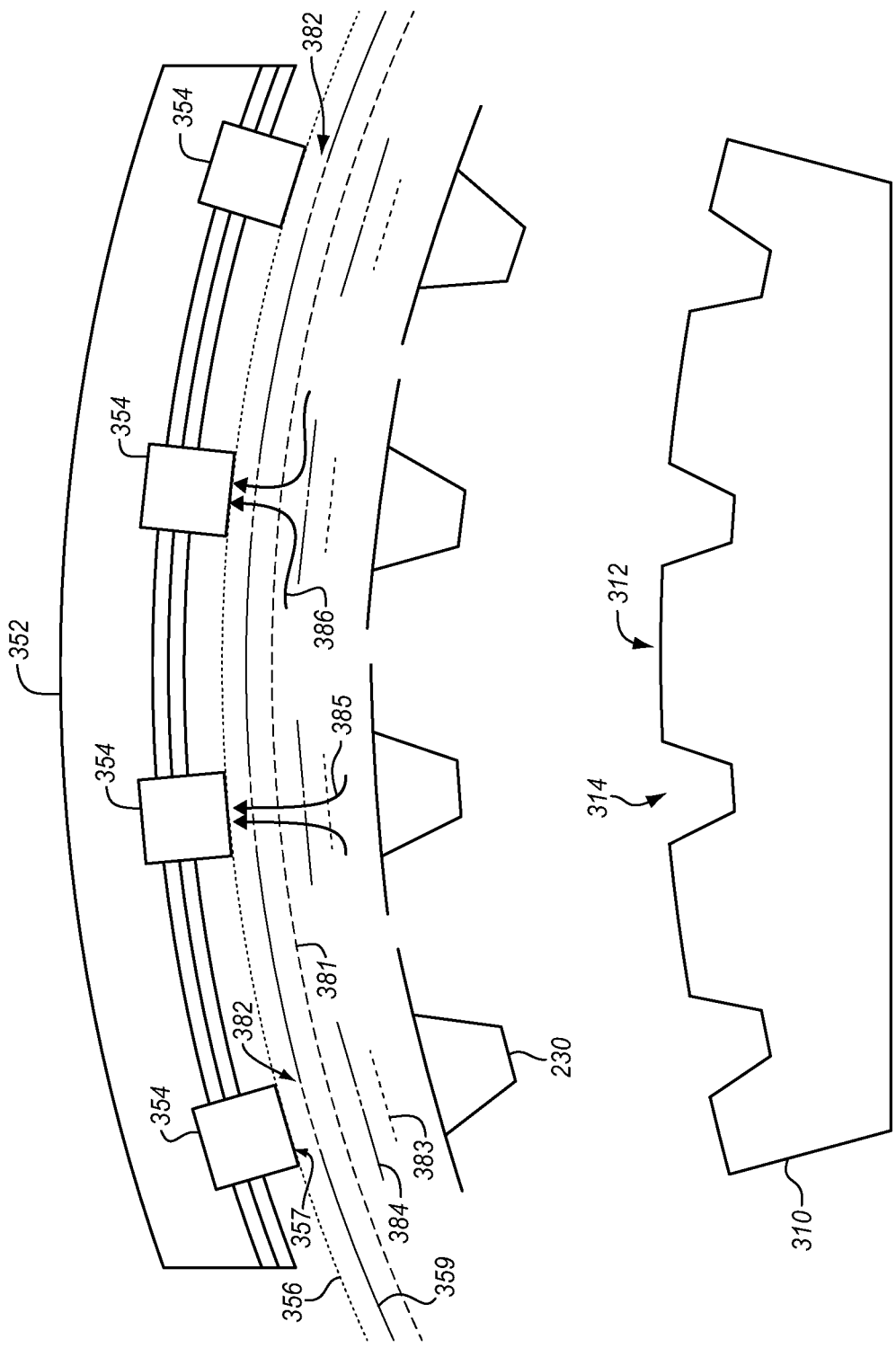

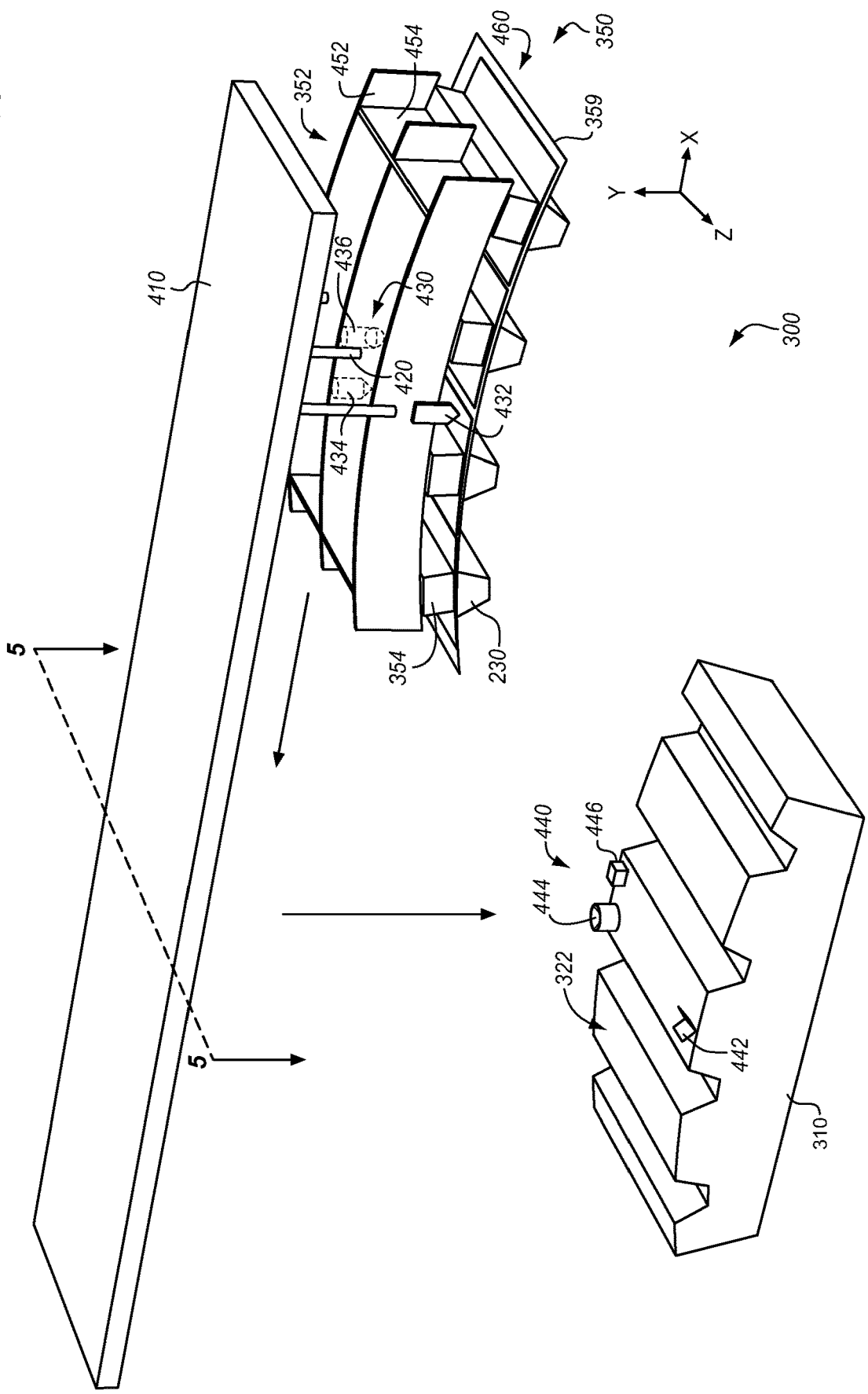

US 11,904,558 B2

PLACEMENT AND COMPACTION OF MULTIPLE OBJECTS VIA VACUUM HEADS WITH FLOATING END EFFECTORS

RELATED APPLICATIONS

This application is related to commonly owned U.S. patent application Ser. No. 16/598,175, filed Oct. 10, 2019, entitled "PLACEMENT AND COMPACTION OF OBJECTS VIA VACUUM" which is hereby incorporated by reference, and this application further claims priority to U.S. Provisional Patent Application No. 63/089,846, filed on Oct. 9, 2020.

FIELD

The disclosure relates to the field of assembly, and in particular, to placement and compaction of objects such as preforms onto rigid tools.

BACKGROUND

A preform for a composite part may be incapable of supporting itself when placed onto a sloped surface of a rigid tool. In particular, placement of large preforms onto rigid tooling that exhibits a complex curvature (e.g., barrel shapes) remains complicated. This is because large preforms have an increased chance of peeling or shifting from the rigid tooling during or after placement. Furthermore, materials such as tacky tape used to secure a vacuum bag to the surface of a rigid tool are not contact approved, and hence are not allowed to touch uncured composite material. As a result, the entire layup must be completed prior to compaction of the layup to the rigid tooling via a vacuum bag. These difficulties are further compounded for preforms that are composed of a large number of different objects.

Thus, it remains desirable to quickly and effectively move and secure objects to complex surfaces.

SUMMARY

Embodiments described herein provide for a high-volume vacuum securement head that picks, places, and compacts multiple objects (e.g., stringer preforms) at once onto complex surfaces via vacuum. Specifically, the heads described herein include strongbacks that retain an array of adjustable end effectors in conformance with a contour of a rigid tool (e.g., a layup tool or cure tool, such as a mandrel) as the end effectors pick up, place, and compact multiple objects at once. In one embodiment, each end effector is freely translatable along circumferential and/or radial directions relative to the strongback and/or rigid tool, and each end effector is also rotatable to engage in surface contact with an object being picked up and placed. This adjustability facilitates rapid alignment of the end effectors of the vacuum head with the objects and the rigid tools.

One embodiment is an apparatus for handling objects. The apparatus includes a vacuum securement head. The vacuum securement head includes a strongback, and an array of end effectors arranged at the strongback in conformance with a contour. The contour is complementary to a pickup tool. The array of end effectors is configured to pickup objects at the pickup tool. The vacuum securement head also includes an impermeable membrane that is penetrated by the end effectors, and a vacuum system configured to provide suction through the end effectors. The suction is configured to remove air between the impermeable membrane and a rigid tool, and offset air leaks between the impermeable membrane and the rigid tool.

A further embodiment is a method for handling objects. The method includes aligning end effectors of a vacuum securement head with objects disposed at a pickup tool, wherein the end effectors are arranged in a contour that is complementary to the pickup tool, covering the objects with an impermeable membrane attached to the end effectors, forming a suction hold that secures the objects to the vacuum securement head, transporting the objects to a rigid tool while the suction hold is retained, wherein the rigid tool is complementary to the contour; and compacting the objects to the rigid tool via suction applied at the vacuum securement head.

A further embodiment is a non-transitory computer readable medium embodying programmed instructions which, when executed by a processor, are operable for performing a method for picking up, placing, and compacting objects. The method includes aligning end effectors of a vacuum securement head with objects disposed at a pickup tool, wherein the end effectors are arranged in a contour that is complementary to the pickup tool, covering the objects with an impermeable membrane attached to the end effectors, forming a suction hold that secures the objects to the vacuum securement head, transporting the objects to a rigid tool while the suction hold is retained, wherein the rigid tool is complementary to the contour, and compacting the objects to the rigid tool via suction applied at the vacuum securement head.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 3B depicts an exploded view of a vacuum securement head for transporting multiple objects concurrently in an illustrative embodiment.

FIG. 4 is a perspective view of a vacuum securement system for transporting multiple objects concurrently in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The objects being picked, placed, and compacted herein comprise preforms for composite parts in many embodiments. Composite parts, such as Carbon Fiber Reinforced Polymer (CFRP) parts, are initially laid-up in multiple layers that together are referred to as a preform. Individual fibers within each layer of the preform may be aligned parallel with each other, but different layers exhibit different fiber orientations in order to increase the strength of the resulting composite part along different dimensions. Furthermore, some layers may comprise woven fabric made from fibers. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
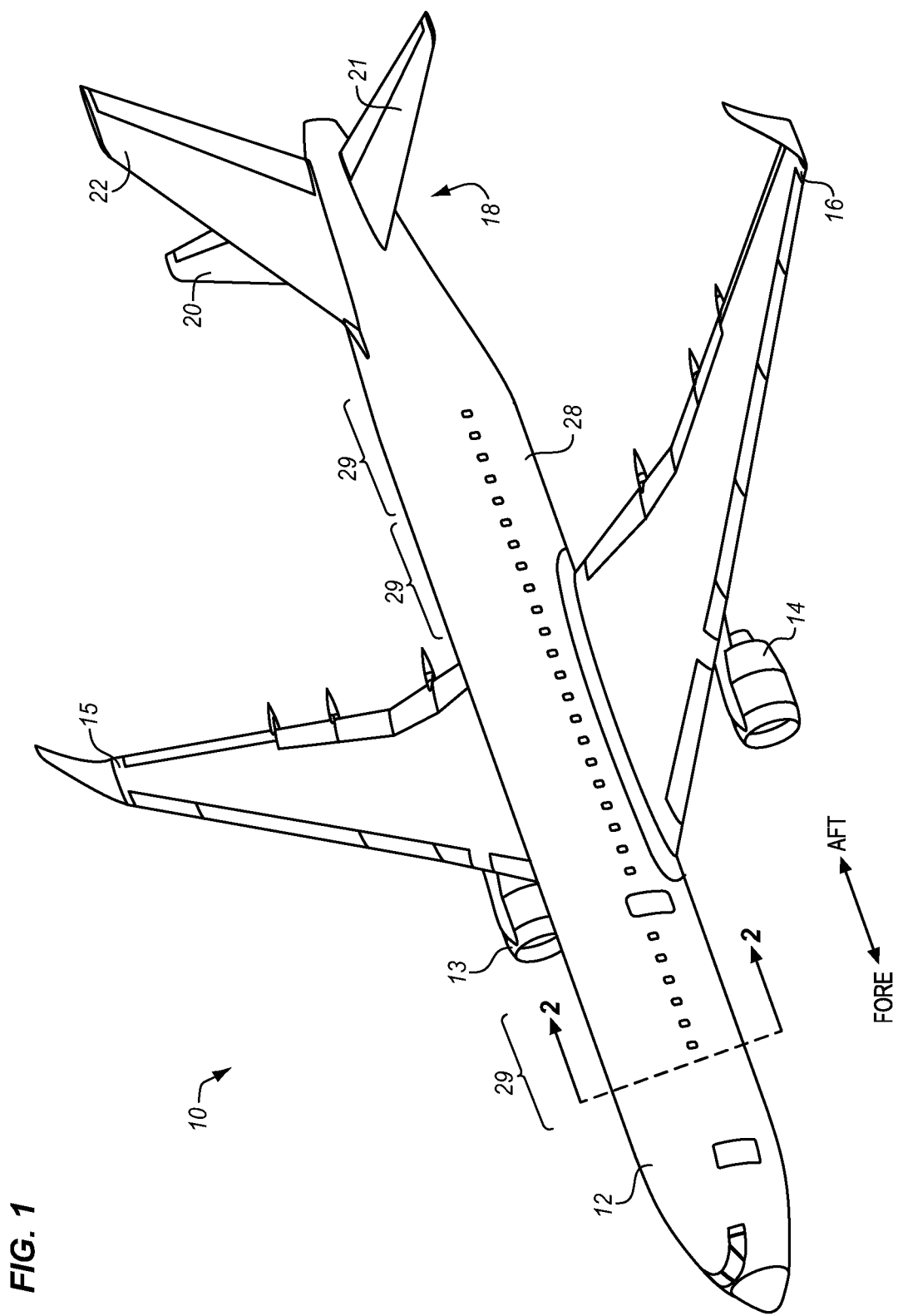
FIG. 1 illustrates an aircraft in an illustrative embodiment.

Turning now to FIG. 1, an illustration of an aircraft 10 is depicted for which the fabrication systems and methods described herein may be implemented. In this illustrative example, aircraft 10 includes wing 15 and wing 16 attached to fuselage 28 having a nose 12. Aircraft 10 includes engine 13 attached to wing 15 and engine 14 attached to wing 16. Tail section 18 is also attached to fuselage 28. Horizontal stabilizer 20, horizontal stabilizer 21, and vertical stabilizer 22 are attached to tail section 18 of fuselage 28. The fuselage 28 itself is formed from multiple barrel sections 29 which have been joined together. In this embodiment, three barrel sections 29 are labeled, but any suitable number of barrel sections 29 may be utilized to form the fuselage 28 as a matter of design choice.

Figure 2:
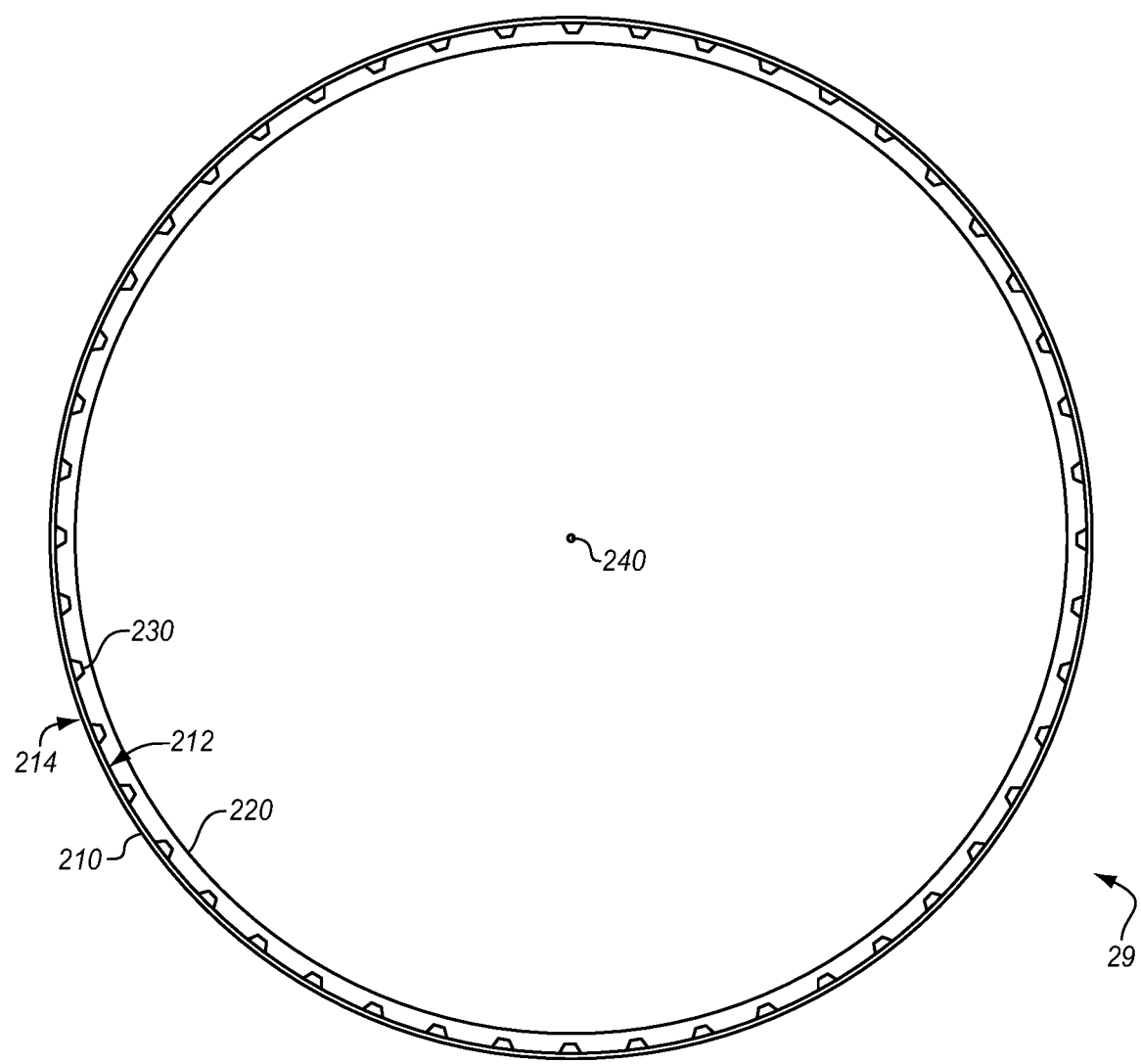
FIG. 2 is a section cut view of a barrel section of an aircraft in an illustrative embodiment.

FIG. 2 is a section cut view of a barrel section 29 of an aircraft 10 in an illustrative embodiment. In this embodiment, the barrel section 29 includes a skin 210, frames 220, and objects 230 (e.g., stringers, such as hat stringers). The barrel section 29 defines an Inner Mold Line (IML) 212, and an Outer Mold Line (OML 214). The IML 212 and the OML 214 may correspond with a surface that contacts a rigid tool during hardening, and a surface that faces outward from a rigid tool during hardening, respectively.

In an operating environment, the placement of the objects 230 involves picking up an object 230 from a pickup tool, such as a layup tool upon which the object 230 has been laid-up as a preform for a composite part. After the object 230 is picked up, the object 230 is carried to a rigid tool, such as an IML cure tool for hardening the object. After the object 230 is placed with multiple other objects 230 and a section of the skin 210, the objects and the section of skin are hardened together (e.g. via the application of heat and pressure in an autoclave) to form an integral composite part which defines a radial segment of the barrel section. After hardening and during assembly of the barrel section 29, the integral composite parts are arranged radially around a center point 240 and affixed together, forming the barrel section.

Placement of objects 230 onto rigid tools for hardening remains a difficult process, because the barrel section 29 is contoured, and an object 230 may be constrained to placement within a tolerance of a fraction of an inch or less along an entire length (e.g., twenty feet, sixty feet, etc.) of the object 230. Furthermore, the objects 230 may be co-cured with skin 210 and/or other components at the rigid tool, which may necessitate the placement of multiple instances of the objects 230 onto a single rigid tool prior to hardening. Placement processes for the objects 230 are therefore substantially time consuming as each object 230 is positioned at the rigid tool.

Figure 3A:
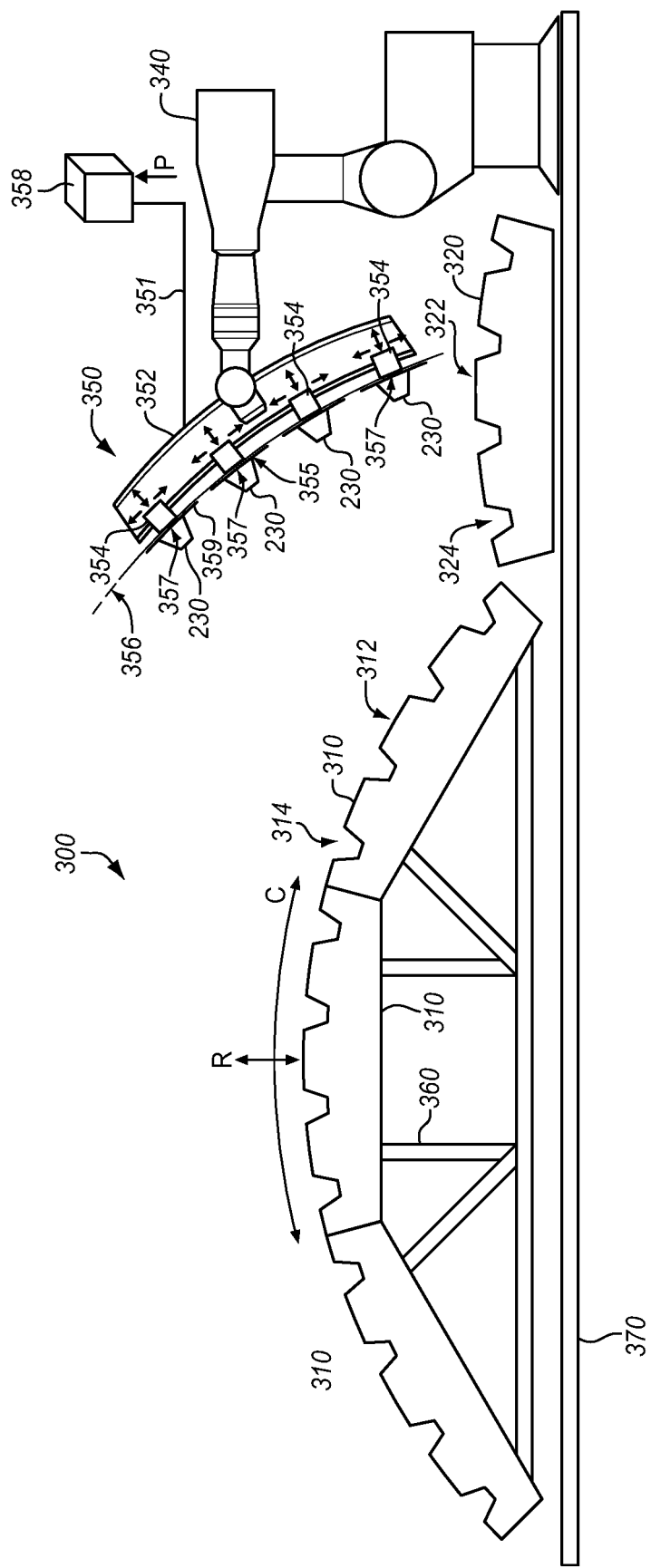
FIG. 3A depicts a vacuum securement system for transporting multiple objects concurrently, as well as rigid tools for receiving the objects, in an illustrative embodiment.

To address these issues with placement of objects 230 such as stringers, FIG. 3A depicts a vacuum securement system 300 for handling objects 230, as well as rigid tools 310 for receiving the objects, in an illustrative embodiment. Specifically vacuum securement system 300 comprises any system, component, and/or device that is operable to pick up multiple objects 230 concurrently via application of vacuum (e.g., negative pressure relative to ambient pressure) to form a suction hold, to transport the objects 230 while the suction hold is maintained, and to utilize vacuum to compact the objects 230 onto a rigid tool 310, such as a cure tool. For example, vacuum securement system 300 may utilize end effectors having the pickup and compaction technology discussed in commonly owned U.S. patent application Ser. No. 16/598,175, filed Oct. 10, 2019, entitled "PLACEMENT AND COMPACTION OF OBJECTS VIA VACUUM" which is hereby incorporated by reference. While the discussion herein focuses upon transport of objects comprising stringers for a section of fuselage, in further embodiments similar techniques and devices are utilized to place objects for any suitable portion of the structure of an aircraft.

In this embodiment, the vacuum securement system 300 includes multiple rigid tools 310 (e.g., IML, cure tools) that are arranged together on a support structure 360 disposed at a factory floor 370. The rigid tools 310 each define a contour 312. In one embodiment, the contour 312 corresponds (i.e., mates with, matches, and/or defines) with the IML 212 of a barrel section 29, and also include troughs 314 for receiving the objects 230. Radial (R) and circumferential (C) directions are also indicated relative to the rigid tools 310, although these directions may also be defined relative to the vacuum securement head 350 and pickup tool 320.

Prior to transfer to the rigid tools 310, the objects 230 are initially stored in a pickup tool 320, such as a layup tool for preforms. In one embodiment, the pickup tool 320 defines a contour 322 that arranges the objects 230 in the same configuration in which the objects 230 will be held after assembly. In one embodiment, the contour 322 corresponds with the IML 212. The pickup tool 320 also includes troughs 324 for holding the objects 230. In one embodiment, the contour 322 and troughs 324 are dimensioned to correspond with (i.e., mate with, match, and/or equal) the contours 312 and troughs 314 of the rigid tools 310.

To increase throughput and speed of placement of the objects 230 from the pickup tool 320 to the rigid tools 310, vacuum securement system 300 includes a vacuum securement head 350 having an array 355 of end effectors 354 for picking up and placing the objects 230. In this embodiment, the vacuum securement head 350 is attached to a robot arm 340. However, in further embodiments, the vacuum securement head 350 is attached to a crane or other piece of heavy machinery.

The vacuum securement head 350 is coupled with a vacuum system 358 (e.g., a compressor or pump). The vacuum system 358 generates volumetric flow to provide suction through the end effectors 354 that removes air between one or more impermeable membranes (e.g., impermeable membrane 359) and a rigid tool 310. The amount of volumetric flow of the suction is sufficient to offset (e.g., equal or exceed) air leaks between the impermeable membranes and the rigid tool 310. The suction (i.e., negative pressure relative to ambient pressure, such as relative to atmospheric pressure) is used both to pick up the objects 230, and also to compact the objects 230 onto the rigid tool 310. Specifically, the vacuum system 358 generates sufficient volumetric flow at a desired pressure (P) to offset and/or overcome air leaks at each end effector 354 when the end effectors 354 perform gripping (i.e., forming of a suction hold on an object 230) and/or compaction. This means that the objects 230 do not need to be sealed via tape, sealant, or other materials to the vacuum securement head 350 during transport, and do not need to be sealed to the rigid tool 310 during compaction. In one embodiment, vacuum system 358 applies twenty-two to twenty-nine inches of mercury of negative pressure to form a vacuum, but at tens of Cubic Feet per minute (CFM) of airflow (e.g., between fifty and two hundred CFM). The vacuum system 358 is coupled with the vacuum securement head 350 via supply line 351.

In this embodiment, the vacuum securement head 350 includes a strongback 352 and end effectors 354. The end effectors 354 are attached to the strongback 352. The strongback 352 arranges the end effectors 354 such that faces 357 of the end effectors 354 (that contact the objects 230) are aligned in conformance with a contour 356 that is complementary to the contours 312 of the rigid tools 310 (and/or to the contour 322 of the pickup tool 320). For example, the end effectors 354 may be aligned such that their faces 357 are tangential to the contour 356 and contact the contour 356. In one embodiment, the strongback 352 is itself shaped in conformance with the contour 356. In such an embodiment, the strongback 352 may exhibit a greater or smaller radius of curvature than the contour 356, such that when faces 357 are placed in alignment, they are held tangential to the contour 356 and contact the contour 356.

Because each rigid tool 310 defines a portion of the IML 212 of a barrel section 29, the contour 356 may be complementary to the IML 212 of the barrel section 29 in one embodiment. In this embodiment, each end effector 354 is also adjustable via active or passive means in circumferential and/or radial directions, in order to facilitate alignment and to accommodate tolerancing concerns. An impermeable membrane 359 is secured to each of the end effectors 354, to facilitate compaction processes for the objects 230 as discussed in the patent application incorporated by reference. Specifically, as will be described in detail below, the impermeable membrane 359 covers the objects 230 as placed onto the rigid tool 310. When suction is applied between the impermeable membrane 359 and the rigid tool 310, the impermeable membrane 359 is pulled towards the rigid tool 310, which compresses the objects 230 into place.

The impermeable membrane 359 is impermeable to gas, and may comprise a plastic or rubberized sheet. The impermeable membrane 359 is not glued or attached to the rigid tool 310, but rather rests atop it. When a vacuum is applied to the permeable layer 381 (e.g., via one or more holes within an interior of the impermeable membrane 359), the borders of the impermeable membrane 359 will form a suction hold against the rigid tool 310, such that more air is being drawn out than is capable of entering via any leaks between the rigid tool 310 and the impermeable membrane 359 at the border of the permeable layer 381.

During operation, the robot arm 340 positions the vacuum securement head 350 over the pickup tool 320, forms a suction hold on each of the objects 230, transports the objects 230 concurrently into contact with a rigid tool 310, and applies compaction force to the objects 230 to press the objects into place at the rigid tool 310.

FIG. 3B depicts an exploded view of a vacuum securement head for transporting multiple objects concurrently in an illustrative embodiment. Specifically, FIG. 3B illustrates various arrangements of permeable layers and impermeable membranes at a vacuum securement head 350 in an illustrative embodiment, such that these components facilitate both the formation of a suction hold at objects 230, and compaction of those objects 230 at a rigid tool 310. In this embodiment, impermeable membrane 359 includes cut-outs 382 via which the end effectors 354 penetrate the impermeable membrane 359.

The end effectors 354 are configured to selectively apply suction in two different modes. In the first mode, the end effectors 354 apply suction through (e.g., continuing through the thickness and also across the length of) permeable layers 383 up to the edges of impermeable membranes 384 in order to form a suction hold upon the objects 230. Specifically, by removing air from under impermeable membranes 384, the impermeable membranes 384 are pulled into contact with the objects 230. This operation is shown by arrows 385. In the second mode, the end effectors 354 apply suction along permeable layer 381. This removes air from underneath impermeable membrane 359, which pulls the impermeable membrane 359 against the rigid tool 310, compacting the objects 230 against the rigid tool 310. Specifically, by removing air from under the impermeable membrane 359, the impermeable membrane 359 is pulled into contact with the contour 312 defined by the rigid tool 310. This operation is shown by arrows 386.

In this embodiment, permeable layers 381 and 383 are each both laterally and vertically air-permeable. The use of permeable layers 381 and 383 therefore ensures that a sufficient volume of air moves across an object to apply negative pressure evenly across the object, instead of being localized at a vacuum port. Where the permeable layer 381 terminates, the impermeable membrane 359 grips the underlying rigid tool 310. Where the permeable layers 383 terminate, the impermeable membranes 384 grip the object 230. Thus, when suction is applied via arrows 385, a grip is applied to the object 230. When suction is applied via arrows 386, compaction of the objects 230 onto the rigid tool 310 is performed.

Permeable layers 381 and 383 each comprise a material that is capable of deforming as suction draws the impermeable membranes 359 and 384 toward an object. Thus, permeable layers 381 and 383 draw snugly over an object 230 and rigid tool 310, respectively, while still enabling air to be drawn freely across. In this manner, permeable layers 381 and 383 enable the drawing of air across an area without causing markoff or leaving some type of undesirable mark upon the area. For example, permeable layers 381 and 383 may each comprise a compliant biplanar mesh of material that facilitates airflow. Permeable layers 381 and 383 are each made of a high-flow material, which is to say that permeable layers 381 and 383 each do not substantially restrict the rate at which a pump draws air. The resistance of each of permeable layers 381 and 383 to airflow therefore has a negligible impact on the flow rate of a vacuum system that applies a negative pressure. In some embodiments, permeable layers 381 and 383 each comprises an open celled foam material. However, in such embodiments, the open celled foam material chosen is sufficiently rigid that it does not collapse when a suction hold is applied, and sufficiently open that airflow is not inhibited. Collapsing of either of the permeable layers 381 and 383 would shut off or restrict air flow, which is undesirable as air flow would then be restricted. Permeable layers 381 and 383 may each comprise a contact approved material that is acceptable for use with carbon fiber composites and does not chemically interact with resin.

FIG. 4 is a perspective view of a further vacuum securement system 300 for transporting multiple objects concurrently in an illustrative embodiment. Movement and orientation of components of the system 300 is depicted and described relative to example coordinate systems that include mutually orthogonal axes (e.g., X, Y, and Z), although other configurations of relative movement/orientation are within the scope of this disclosure. In this embodiment, the vacuum securement system 300 includes a vacuum securement head 350 which is attached to tensile members 420 (e.g., chains, cords, etc.) that are adjustable and are disposed at a gantry 410. By moving (e.g., sliding) the tensile members 420 along the gantry 410, a position of the vacuum securement head 350 may be adjusted along X until the vacuum securement head 350 is disposed over the rigid tool 310. The impermeable membrane 359 extends along Z and X across multiple objects 230 such that its edges 460 extend beyond the multiple objects 230. The impermeable membrane 359 is secured to each of the end effectors 354, such as by being clamped between portions of the end effectors 354. In one embodiment, the impermeable membrane 359 forms a large sheet which includes cut-outs into which the end effectors 354 are inserted. In this manner, the end effectors 354 penetrate through the impermeable membrane 359.

FIG. 4 clarifies a geometry of strongback 352 in an illustrative embodiment. In this embodiment, strongback 352 is made from lateral members 452, which arrange end effectors 354 into a contour 356. The lateral members 452 are separated from each other along the Z direction, and are attached to each other via depthwise members 454. This means that the vacuum securement head 350 has notable depth along the Z direction that may correspond with a length of an object 230 (e.g., twenty feet, sixty feet, etc.). The lateral members 452 and depthwise members 454 may be made from any suitable rigid material, such as metal, ceramic, CFRP, etc.

Because the strongback 352 includes multiple lateral members 452, a vacuum securement head 350 may include multiple sets of end effectors 354 that are each arranged in an arc at a lateral member 452 at a different position along the Z direction. Thus, an object 230 that extends for tens of feet in the Z direction may be held via multiple end effectors 354 that are disposed at different ones of lateral members 452.

FIG. 4 further illustrates that the vacuum securement head 350 may include indexing elements 430, which are designed to mate with corresponding indexing elements 440 at the rigid tool 310, in order to facilitate alignment. Specifically, in this embodiment the indexing elements 430 include a chevron 432 that is dimensioned to nest within a channel 442 at the rigid tool 310, a cone 434 that is dimensioned to mate with a cup 444 at the rigid tool 310, and a roller 436 that mates with a stop 446 at the rigid tool 310. Further details of an indexing operation for a vacuum securement head 350 are provided with regard to FIG. 5.

Figure 5:
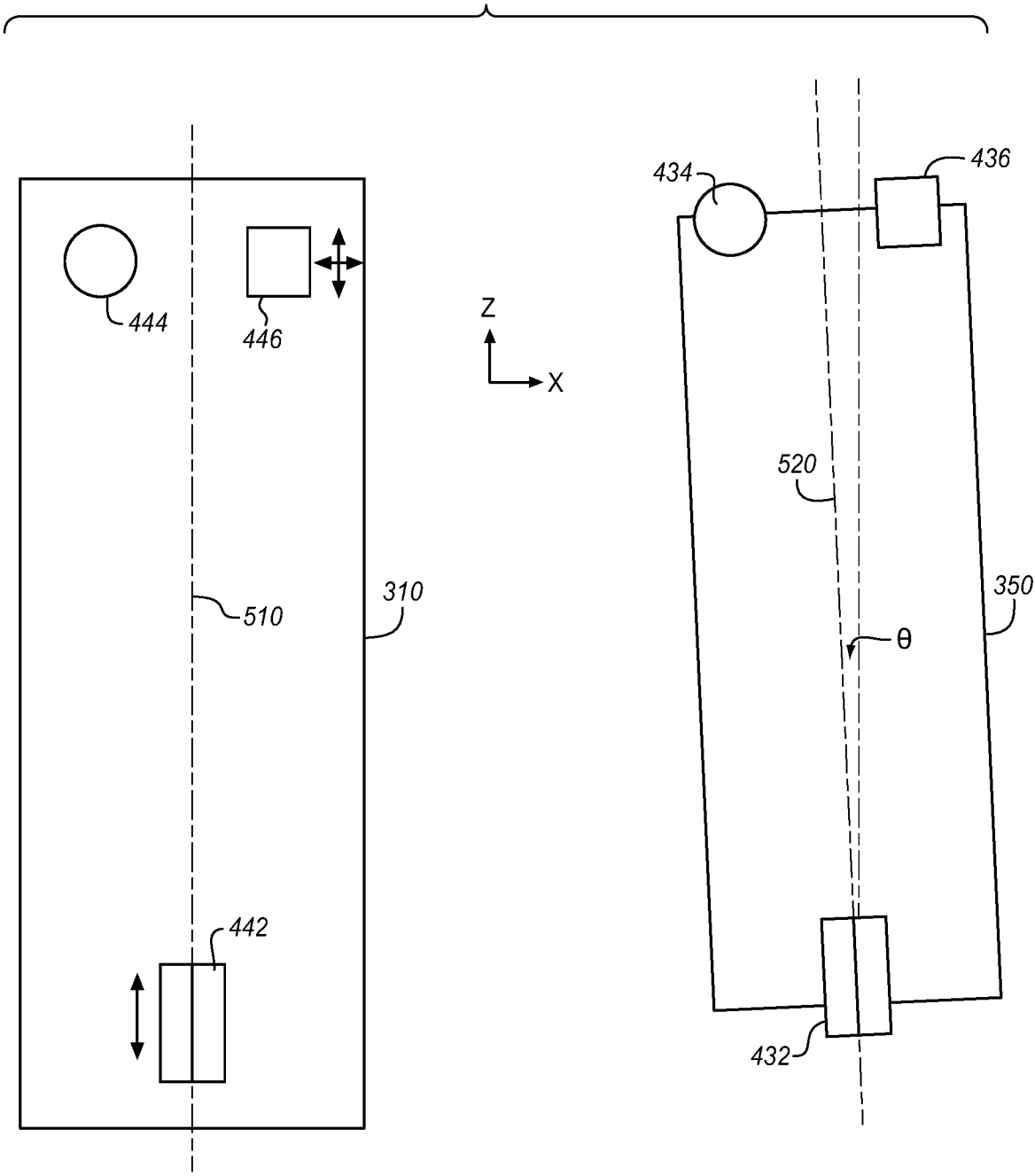
FIG. 5 is a top schematic view of alignment of a vacuum securement head with a rigid tool in an illustrative embodiment.

FIG. 5 is a top schematic view of alignment of a vacuum securement head 350 with a rigid tool in an illustrative embodiment, and corresponds with view arrows 5 of FIG. 4. In this embodiment, a centerline 520 of a vacuum securement head 350 exhibits an angular and positional deviation from a centerline 510 of a rigid tool 310. FIG. 5 illustrates that the mating of chevron 432 with channel 442 restricts angular deviation (δ) of the vacuum securement head 350 relative to the rigid tool 310, yet permits translation along Z. Mating of the roller 436 with the stop 446 permits translation along Z and X, but restricts translation along Y (i.e., into the page). Furthermore, mating of the cone 434 with the cup 444 restricts translation along X, Y, and Z. By mating the indexing elements 430 with the indexing elements 440, the vacuum securement head 350, which may be tens of feet long, can be securely rotated and translated such that the objects which it carries align with troughs at the rigid tool. Furthermore, differences in shape resulting from changes in temperature and/or fabrication tolerance deviations are accommodated by the nature of the indexing elements utilized in the alignment process.

Figure 6:
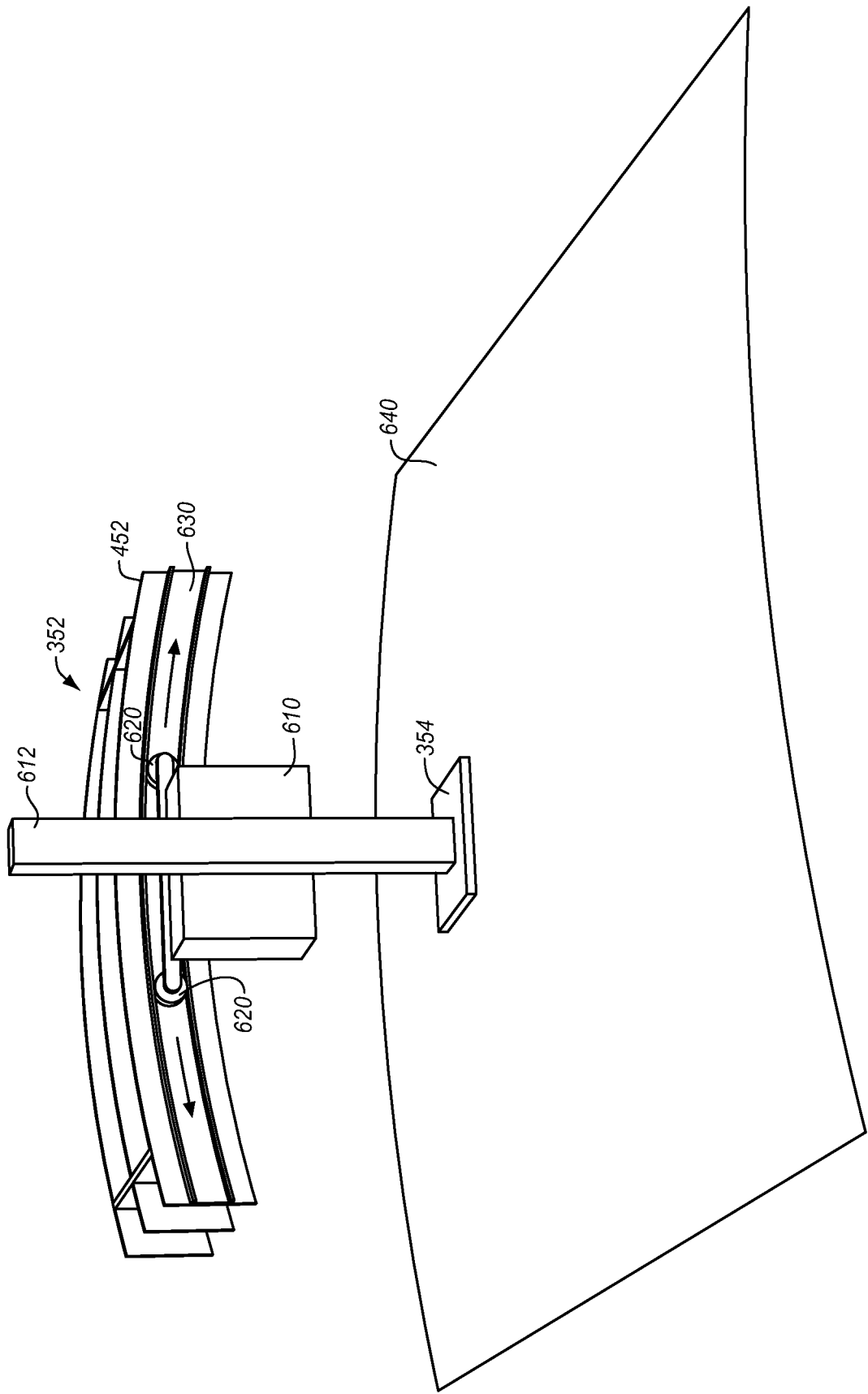
FIG. 6 depicts an end effector that is adjustably coupled with a strongback of a vacuum securement head in an illustrative embodiment.

FIG. 6 depicts an end effector 354 that is adjustably coupled with a strongback 352 of a vacuum securement head in an illustrative embodiment. In this embodiment, an end effector 354 is secured via a support 612 and housing 610 to a lateral member 452 of a strongback 352 disposed over a surface 640. The housing 610 advances along track 630 of the lateral member 452 via rollers 620, which may be motorized and/or controlled in accordance with a Numerical Control (NC) program. In short, the track 630 provides for motion of the end effectors 354 along the contour 356. By adjusting the positions of end effectors 354 at different ones of lateral members 452, a vacuum securement head 350 can be reconfigured to accommodate objects that curve along their lengths, or can be reconfigured to accommodate different designs for different portions of an aircraft. This flexibility is particularly beneficial when each end effector 354 is capable of being actively driven to new circumferential positions.

Figure 7:
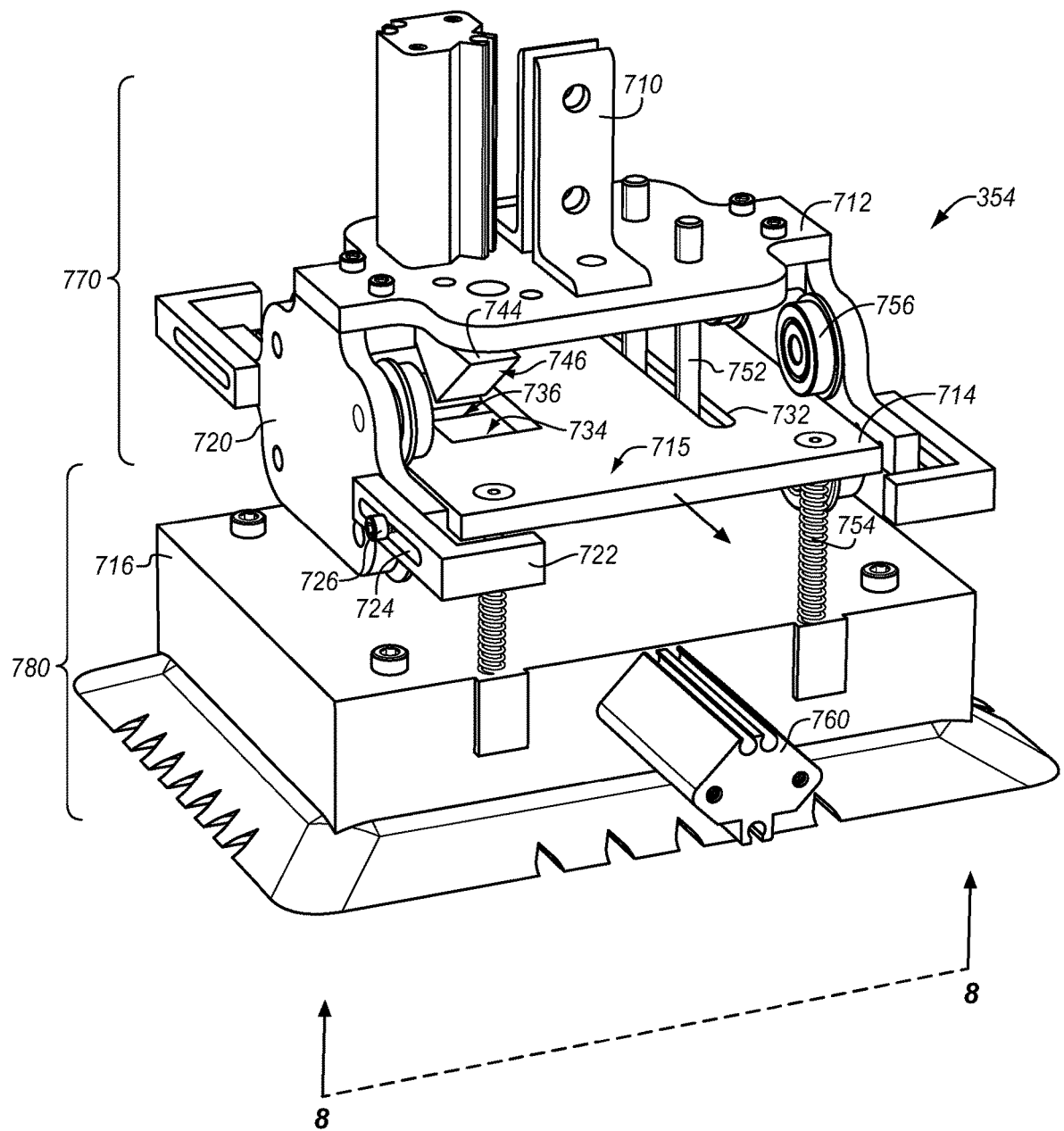
FIGS. 7-9 depict an end effector of a vacuum securement head in an illustrative embodiment.
Figure 8:
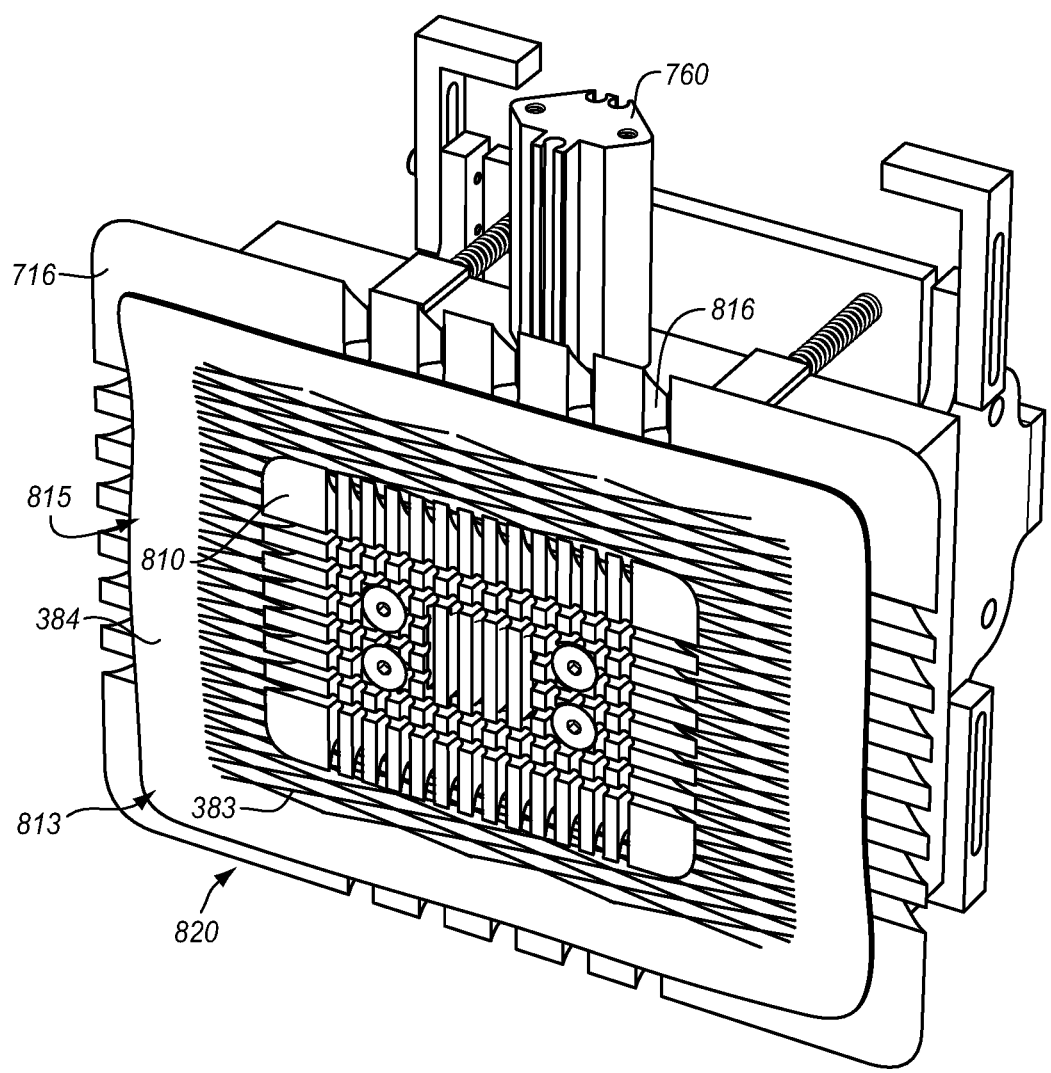
Figure 9:
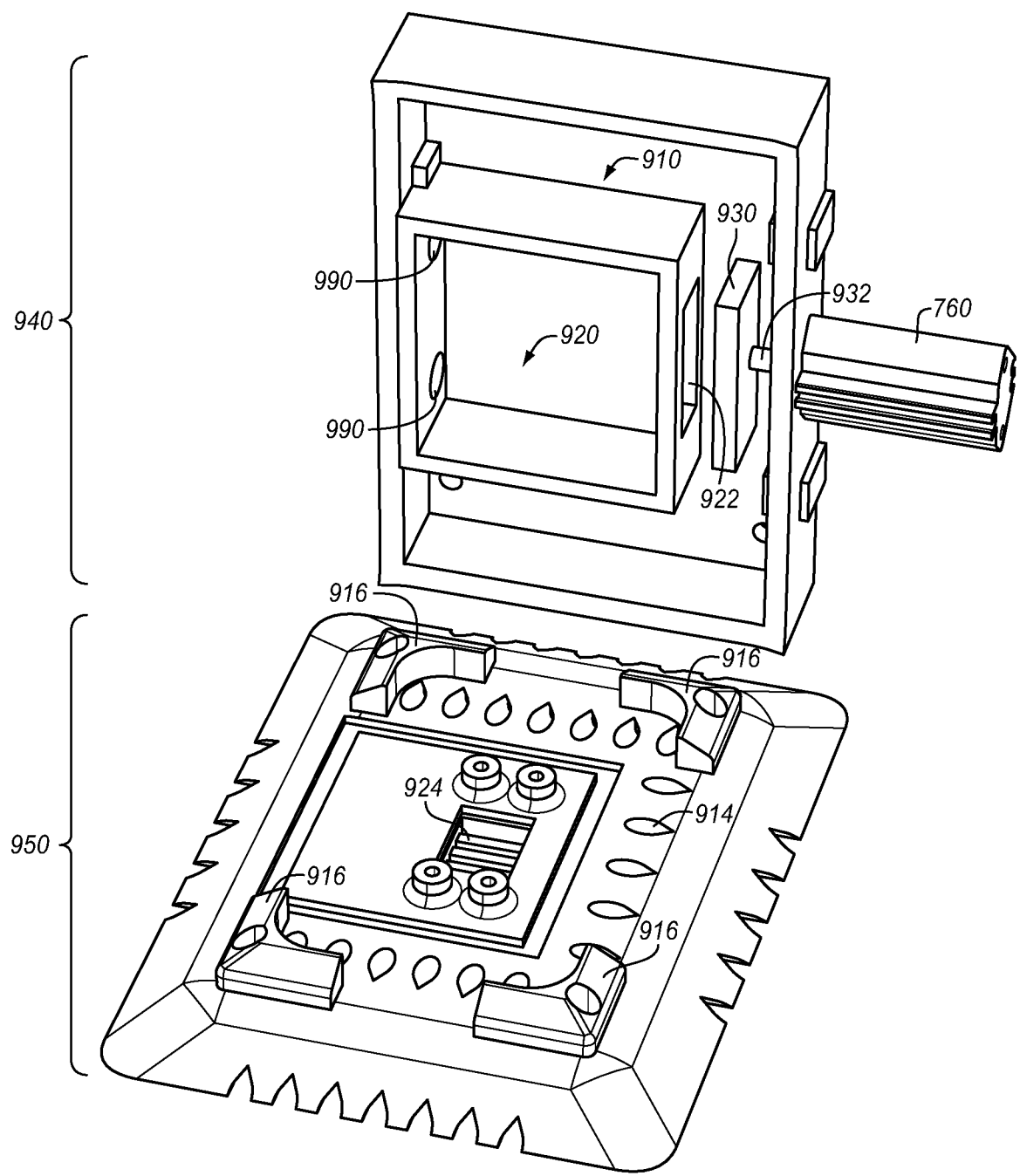

While the aforementioned drawings show the geometry and arrangement of components at a vacuum securement head 350, FIGS. 7-9 depict details of end effectors 354. Specifically, FIGS. 7-9 depict an end effector 354 of a vacuum securement head 350 in an illustrative embodiment. In this embodiment, the end effector 354 is subdivided into a fixed portion 770 and a floating portion 780. The floating portion 780 is capable of translating and/or rotating to a limited degree relative to the fixed portion 770. This structural aspect of the end effector 354 facilitates alignment with an object 230 at a pickup tool 320, and/or a trough 314 of a rigid tool 310. Thus, the end effector 354 may accommodate deviations of, for example, up to three quarters of an inch in a circumferential or radial direction, when placing objects 230. This in turn enhances the ease of picking up, placing, and compacting the objects 230.

The fixed portion 770 comprises support 710, top plate 712, end plates 720 (which define slots 724), arms 722, and securement pins 752. The support 710 is fixedly attached to the top plate 712, which is fixedly attached to the end plates 720. Arms 722 are fixed to end plates 720 via pins 726, which reside in slots 724. By unfastening the pins 726 and moving arms 722, a permitted range of float for the floating portion 780 can be controlled along the circumferential direction (indicated by the arrow). Securement pins 752 are disposed within slots 732 of the floating portion 780, and retain the floating portion 780 to prevent the floating portion 780 from separating from the fixed portion 770. Rollers 756 are fixed to end plates 720, and spin against the surface 715 of a mid plate 714 of that floats in the circumferential direction. Additionally, a lock 744 (e.g., an actuatable lock) is dimensioned for insertion into a slot 734 of the floating portion 780, such that an angled surface 746 of the lock 744 mates with an angled surface 736 of the slot. By driving the lock 744 into contact with the slot 734, the floating portion 780 of the end effector 354 is driving into a default position along the circumferential direction and is held in place.

The floating portion 780 includes mid plate 714, which is coupled via suspension springs 754 with a vacuum block 716. As the floating portion 780 floats (e.g., permits a limited degree of motion) in the circumferential direction, the mid plate 714 and vacuum block 716 move freely. The slot 732 moves relative to the securement pins 752, and the surface 715 of the mid plate 714 is guided by the rollers 756 of the end plates 720. The mid plate 714 is capable of floating to a limited degree, and this limited degree is controlled by the position of the arms 722, which physically block the motion of the mid plate 714. The floating portion 780 further comprises an actuator 760, which drives an internal plunger to control the application of negative pressure (i.e., suction) to the vacuum block 716.

Further details of the arrangement of vents at the vacuum block 716 are provided with regard to FIG. 8. FIG. 8 depicts the end effector 354 from a perspective view that corresponds with view arrows 8 of FIG. 7. FIG. 8 makes clear that the vacuum block 716 includes a face 820 which is placed against an object 230 being transported and/or compacted. The face 820 includes a first set of vents 810 that apply suction in an area where a permeable layer 383 (e.g., a biplanar mesh) is disposed. The permeable layer 383 enables gas to flow through it, while an impermeable membrane 384 interferes with the passage of gas. Thus, in regions of the impermeable membrane 384 that are accompanied by the permeable layer 383, suction is applied freely underneath the impermeable membrane 384. However, in regions of the impermeable membrane 384 that are not accompanied by the permeable layer 383, the impermeable membrane 384 forms a barrier to suction. This causes the boundary 813 between the permeable layer 383 and the impermeable membrane 384 to define the boundaries of a region in which suction is applied by the end effector 354 via the first set of vents 810.

When a sufficient amount of volumetric flow is provided through the end effectors 354, the suction overcomes any air leaks that exist between the impermeable membrane 384 and the object. The amount of volumetric flow required to maintain grip may also depend on the weight of the object being picked up, an ambient pressure at the factory floor, and a distance between the boundary 813 and edges 815 of the impermeable membrane 384. In this case, because the boundary 813 is close to the end effector 354, suction is applied in a region that directly contacts the object 230, which facilitates gripping of the object 230 via the end effector 354.

A second set of vents 816 is disposed above the impermeable membrane 384. The second set of vents 816 apply vacuum via the impermeable membrane 359 (shown in FIG. 3) and a corresponding permeable layer 381, which have been omitted from FIG. 8 for the sake of clarity. The impermeable membrane 359 is disposed between the vents 816 and the impermeable membrane 384. In this embodiment, the impermeable membrane 359 covers the objects 230 being picked up and extends beyond them, while the corresponding permeable layer 381 accompanies the impermeable membrane 359 without extending beyond boundaries of the impermeable membrane 359. The impermeable membrane 359 extends beyond the objects 230 being picked up and onto the rigid tool 310, such that its boundaries are disposed at the rigid tool 310. When suction is applied via vents 816, the impermeable membrane 359 is pulled against the rigid tool 310 and therefore pressed against the objects 230, which facilitates compaction of the objects 230 onto the rigid tool 310 as discussed in the patent application incorporated by reference.

With a discussion of the exterior of an end effector 354 provided above, FIG. 9 and the accompanying description provide insight into the internal configuration of an end effector 354. In particular, FIG. 9 illustrates portions of the end effector 354 by which suction is applied to the first set of vents 810 and/or second set of vents 816 shown in the prior drawings, i.e. FIGS. 7-8. By varying the portion of the end effector 354 that receives suction, the end effector 354 may transition between gripping and compaction of an object. FIG. 9 is an exploded view of the vacuum block 716, depicting an upper segment 940 and a lower segment 950. The upper segment 940 includes a first portion 920, and a second portion 910. The first portion 920 includes passage 922 that communicates with the second portion 910. A plunger 932 is capable of extending to cover the passage 922 with a seal 930. When the passage 922 is covered by the seal 930, suction from vacuum ports 990 is applied solely to first portion 920. Negative pressure applied via the first portion 920 causes a suction hold to be formed with an object 230.

When passage 922 is not covered by the seal 930, suction is applied to both the first portion 920 and the second portion 910. The lower segment 950 includes vents 914 that are disposed within the second portion 910 and that lead to vents 816 (shown in FIG. 8.). Negative pressure applied via the second portion 910 is applied via vents 816, resulting in a region of suction which is bounded by the impermeable membrane 359. Because the impermeable membrane 359 extends beyond the objects 230 onto the rigid tool 310, the suction draws the impermeable membrane 359 to the rigid tool 310, which causes the impermeable membrane to compact the objects 230 into place on the rigid tool 310. The lower segment 950 also includes vents 924 which lead to vents 810 (shown in FIG. 8.). Lower segment 950 also includes projections 916. Projections 916 align with cut-outs at an impermeable membrane 359 (of FIG. 3) that bridges across the end effectors 354 disposed at a vacuum securement head 350. By securing the upper segment 940 to the lower segment 950, the impermeable membrane 359 is secured in place relative to the end effector 354. When secured in aggregate across all of the end effectors 354 of a vacuum securement head 350, the impermeable membrane 359 covers the entirety of the objects 230 being compacted, which ensures that the objects 230 are compacted across their entirety.

Illustrative details of the operation of vacuum securement system 300 will be discussed with regard to FIG. 10. The following explanation describes a series of actions that begin with a number of objects 230 having been laid-up at a pickup tool 320 and awaiting transfer to a rigid tool 310.

Figure 10:
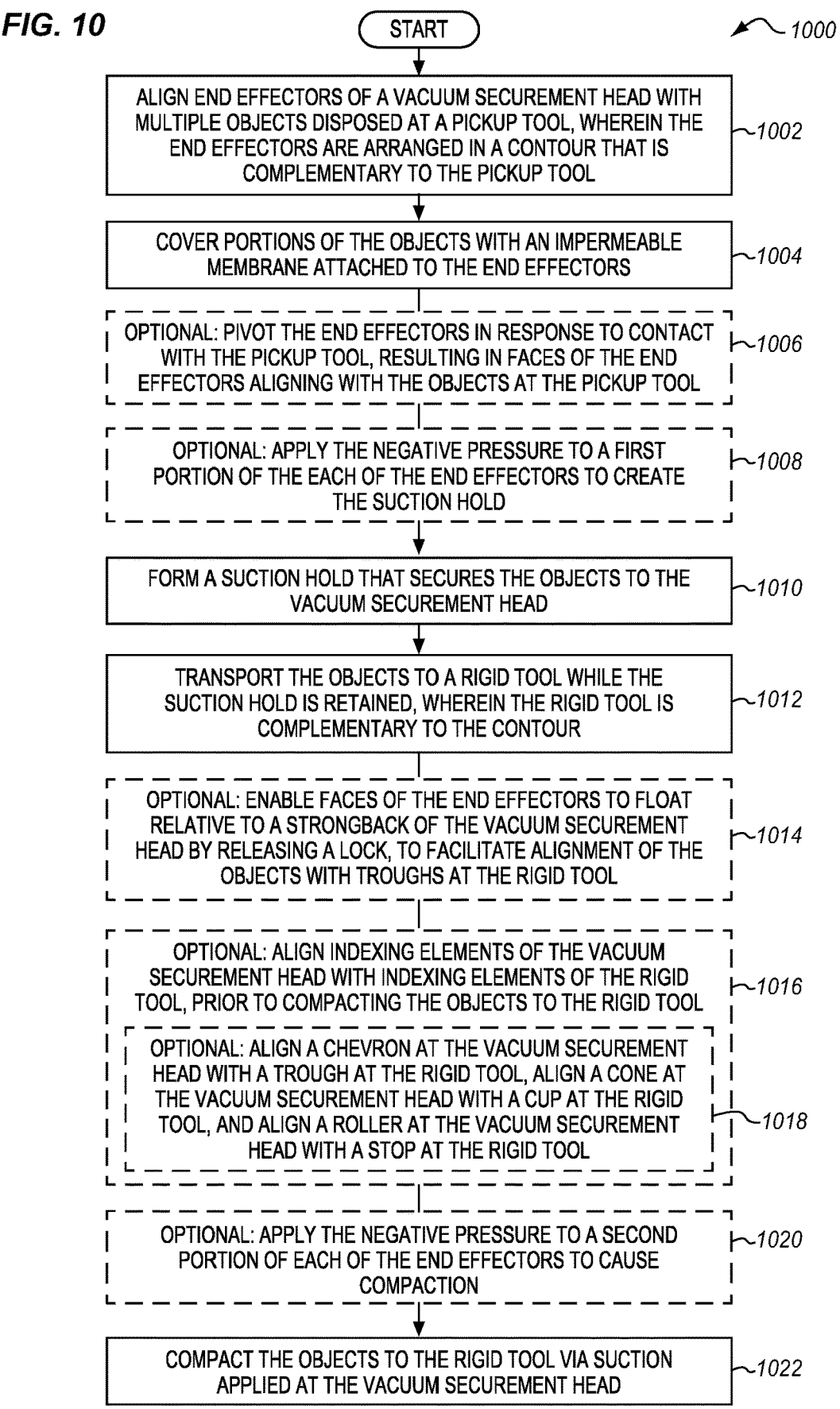
FIG. 10 is a flowchart illustrating a method for operating a vacuum securement system in an illustrative embodiment.

FIG. 10 is a flowchart illustrating a method 1000 for operating a vacuum securement system 300 in an illustrative embodiment. The steps of method 1000 are described with reference to vacuum securement system 300 of FIG. 1, but those skilled in the art will appreciate that method 1000 may be performed in other systems. The steps of the flowcharts described herein are not all inclusive and may include other steps not shown. The steps described herein may also be performed in an alternative order.

Method 1000 includes aligning 1002 end effectors 354 of a vacuum securement head 350 with multiple objects 230 disposed at a pickup tool 320. The end effectors 354 are arranged in a contour 356 that is complementary to the pickup tool 320, and the contour 356 is defined by a strongback 352 of the vacuum securement head 350. In one embodiment, the contour 356 corresponds with an IML 212 of a portion of an aircraft.

Method 1000 further includes covering 1004 the objects 230 with an impermeable membrane 359 attached to the end effectors 354. In one embodiment, the placement of the end effectors 354 over the objects 230 results in the objects 230 being covered by the impermeable membrane 359.

Optionally, method 1000 further includes pivoting 1006 the end effectors 354 in response to contact with the pickup tool 320, resulting in faces 357 of the end effectors 354 aligning against the objects 230 at the pickup tool 320. In one embodiment, pivoting 1006 of an end effector 354 is accomplished in response to suspension springs 754 elastically deforming in response to the end effector 354 being pressed against the object 230.

Optionally, method 1000 further includes applying 1008 negative pressure (e.g., relative to ambient pressure) to a first portion 920 of each of the end effectors 354 to create the suction hold. That is, suction may be applied via the first portion 920 to vents 924, which communicate with vents 810.

Method 1000 further includes a forming 1010 a suction hold that secures the objects 230 to the vacuum securement head 350. This operation may be performed by applying negative pressure via the end effectors 354 that is sufficient to offset air leaks between the objects 230 and the impermeable membranes 384. In one embodiment, in one embodiment, a separate suction hold is formed at each end effector 354, by applying suction via permeable layers 383 that are each bordered by an impermeable membrane 384 that is local to the end effector 354. To transport multiple instances of objects 230, a plurality of suction holds may be formed along the length of each object via end effectors 354 disposed along the vacuum securement head 350.

Method 1000 further includes transporting 1012 the objects to a rigid tool 310 while the suction hold is retained, wherein the rigid tool 310 is complementary to the contour 356. During this process, vacuum is continuously applied to the end effectors 354 to maintain the suction hold, and the vacuum securement head 350 is transported (e.g., via a gantry or robot arm) to a location above a rigid tool.

Optionally, method 1000 further includes enabling 1014 faces 357 of the end effectors 354 to float relative to a strongback 352 of the vacuum securement head 350 by releasing a lock 744, to facilitate alignment of the objects 230 with troughs 314 at the rigid tool 310. This may be performed, for example, by releasing the locks 744 via a pressurized air logic system or via electronic actuators.

Optionally, method 1000 further includes aligning 1016 indexing elements 430 of the vacuum securement head 350 with indexing elements 440 of the rigid tool 310, prior to compacting the objects 230 to the rigid tool 310. This may be performed by technicians or automated means based on images from a camera or other sensor. Optionally, the aligning 1016 further includes aligning 1018 a chevron 432 at the vacuum securement head 350 with a channel 442 at the rigid tool 310, aligning a cone 434 at the vacuum securement head 350 with a cup 444 at the rigid tool 310, and aligning 1018 a roller 436 at the vacuum securement head 350 with a stop 446 at the rigid tool 310.

Optionally, method 1000 further includes applying 1020 the negative pressure to a second portion 910 of each of the end effectors 354 to cause compaction. This may be performed, for example, by adjusting the position of a plunger 932 at each end effector 354, resulting in suction being applied to both first portion 920 and second portion 910.

Method 1000 further includes compacting 1022 the objects 230 to the rigid tool 310 via suction applied at the vacuum securement head 350. In one embodiment, at each end effector 354, the application of suction via second portion 910 results in compaction by pulling the impermeable membrane 359 onto the rigid tool 310, while still gripping the objects 230.

Examples

In the following examples, additional processes, systems, and methods are described in the context of vacuum systems that perform pickup, placement, and compaction of multiple objects concurrently.

Figure 11:
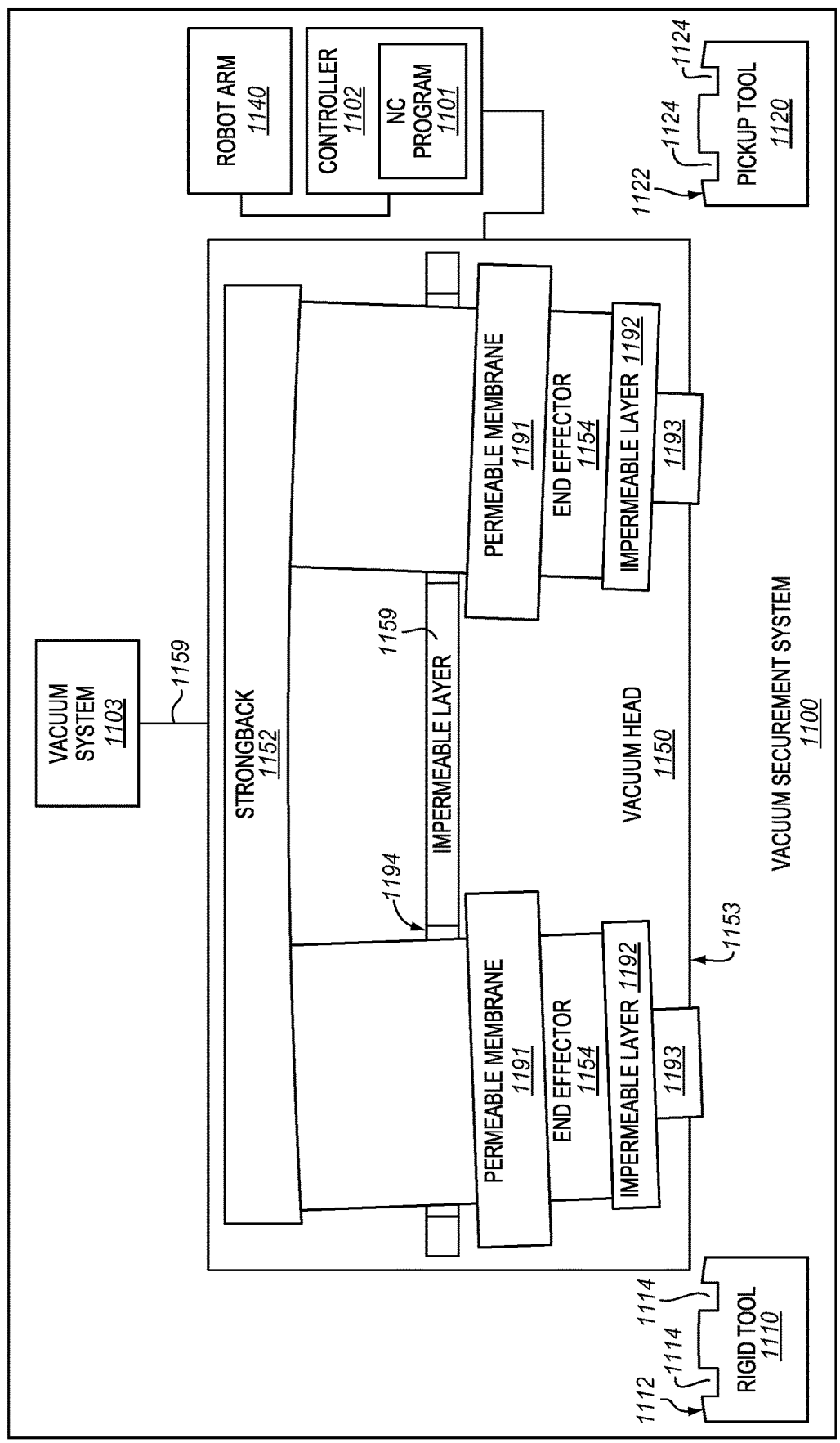
FIG. 11 is a block diagram of a vacuum securement system in an illustrative embodiment.

FIG. 11 is a block diagram of a vacuum securement system 1100 in an illustrative embodiment. In this embodiment, the vacuum system includes a pickup tool 1120 having troughs 1124 and a contour 1122, as well as a rigid tool 1110 having troughs 1114 and a contour 1112. A vacuum head 1150, attached to a robot arm 1140 operating according to instructions stored in an NC program 1101 of a controller 1102, picks up, places, and compacts multiple objects concurrently from the pickup tool 1120 to the rigid tool 1110. In one embodiment, controller 1102 is implemented as custom circuitry, as a hardware processor executing programmed instructions stored in memory, or some combination thereof. A vacuum system 1103 supplies high volume suction to the vacuum head 1150 during operation.

The vacuum head 1150 includes a strongback 1152, which holds end effectors 1154 in conformance with a desired contour 1153. An impermeable membrane 1159 bridges the end effectors 1154, which are inserted through the impermeable membrane 1159 at cut-outs 1194. Both the impermeable membrane 1159 and a permeable layer 1191 extends into the page across multiple end effectors 354 along the length of an object being picked up. The end effectors 1154 are also coupled with an impermeable membrane 1192 and permeable layer 1193. The impermeable membrane 1192 and permeable layer 1193 are local to each end effector 354. That is, each end effector 354 includes its own instance of these features. To apply a suction hold, vacuum is applied through the end effectors 354 to draw air through the permeable layer 1193. To apply compaction, vacuum is applied through the end effectors 354 to draw air through the permeable layer 1193 as well as the permeable layer 1191.

Figure 12:
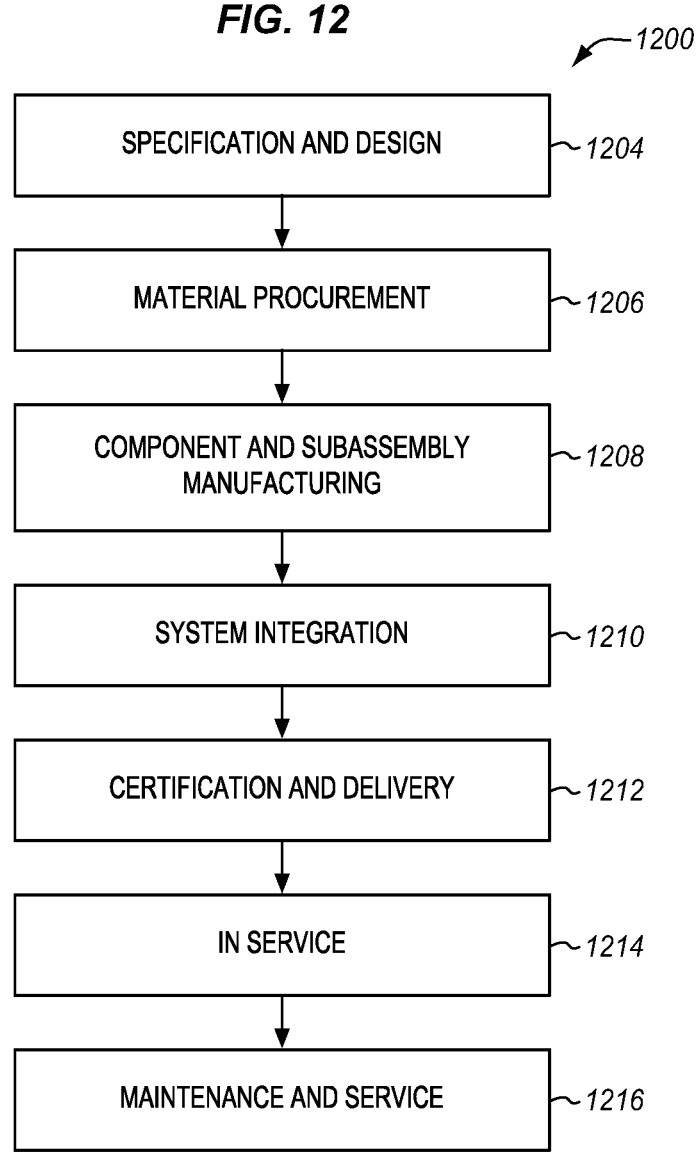
FIG. 12 is a flow diagram of aircraft production and service methodology in an illustrative embodiment.
Figure 13:
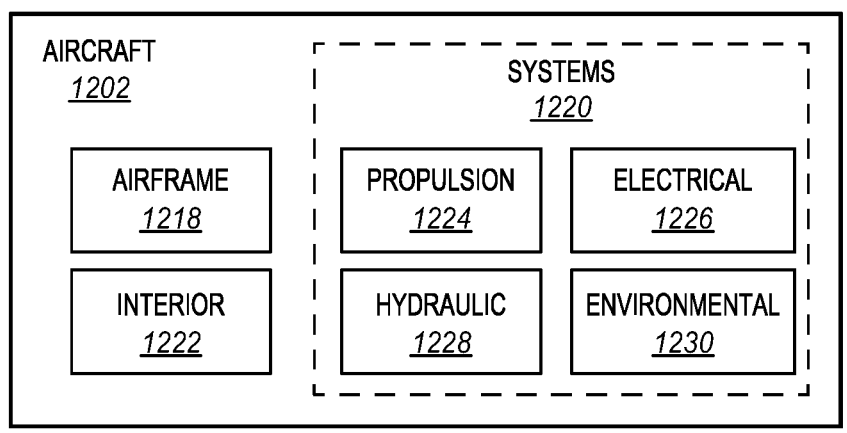
FIG. 13 is a block diagram of an aircraft in an illustrative embodiment.

Referring more particularly to the drawings, embodiments of the disclosure may be described in the context of aircraft manufacturing and service in method 1200 as shown in FIG. 12 and an aircraft 1202 as shown in FIG. 13. During pre-production, method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine work in maintenance and service 1216 (which may also include modification, reconfiguration, refurbishment, and so on). Apparatus and methods embodied herein may be employed during any one or more suitable stages of the production and service described in method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion system 1224, electrical system 1226, hydraulic system 1228, environmental system 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by method 1200 may include an airframe 1218 with a plurality of systems 1220 and an interior 1222. Examples of systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1200. For example, components or subassemblies corresponding to component and subassembly manufacturing 1208 may be fabricated or manufactured in a manner similar to components or subassemblies produced while the aircraft 1202 is in service. Also, one or more apparatus embodiments, method embodiments, or a combination thereof may be utilized during the subassembly manufacturing 1208 and system integration 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation during the maintenance and service 1216. Thus, the invention may be used in any stages discussed herein, or any combination thereof, such as specification and design 1204, material procurement 1206, component and subassembly manufacturing 1208, system integration 1210, certification and delivery 1212, service 1214, maintenance and service 1216 and/or any suitable component of aircraft 1202 (e.g., airframe 1218, systems 1220, interior 1222, propulsion system 1224, electrical system 1226, hydraulic system 1228, and/or environmental system 1230).

In one embodiment, a part comprises a portion of airframe 1218, and is manufactured during component and subassembly manufacturing 1208. The part may then be assembled into an aircraft in system integration 1210, and then be utilized in service 1214 until wear renders the part unusable. Then, in maintenance and service 1216, the part may be discarded and replaced with a newly manufactured part. Inventive components and methods may be utilized throughout component and subassembly manufacturing 1208 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus for handling objects, the apparatus comprising:
   a vacuum securement head comprising:
      a strongback;
      an array of end effectors arranged at the strongback in conformance with a contour, wherein the contour is complementary to a pickup tool, and wherein the array of end effectors is configured to pick up objects at the pickup tool;
      an impermeable membrane that is penetrated by the end effectors; and
      a vacuum system configured to provide suction through the end effectors, wherein the suction is configured to remove air between the impermeable membrane and a rigid tool, and offset air leaks between the impermeable membrane and the rigid tool.

2. The apparatus of claim 1 wherein:
   the strongback is shaped in conformance with the contour.

3. The apparatus of claim 1 further comprising:
a track at the strongback configured to enable movement of the end effectors along the contour.

4. The apparatus of claim 1 further comprising:
indexing elements configured to align the vacuum securement head with the rigid tool.

5. The apparatus of claim 4 wherein:
the indexing elements comprise at least one element selected from the group consisting of:
  a chevron that mates with a channel at the rigid tool;
  a cone that mates with a cup at the rigid tool; and
  a roller that mates with a stop at the rigid tool.

6. The apparatus of claim 1 wherein:
faces of the end effectors are configured to float relative to the strongback of the vacuum securement head.

7. The apparatus of claim 1 wherein:
each end effector comprises a first portion configured to form a suction hold in response to negative pressure, and a second portion configured to cause compaction of the object in response to negative pressure.

8. A method for handling objects, the method comprising:
aligning end effectors of a vacuum securement head with objects disposed at a pickup tool, wherein the end effectors are arranged in a contour that is complementary to the pickup tool;
covering the objects with an impermeable membrane attached to the end effectors;
forming a suction hold that secures the objects to the vacuum securement head;
transporting the objects to a rigid tool while the suction hold is retained, wherein the rigid tool is complementary to the contour; and
compacting the objects to the rigid tool via suction applied at the vacuum securement head.

9. The method of claim 8 further comprising:
aligning the vacuum securement head with the rigid tool, prior to compacting the objects to the rigid tool.

10. The method of claim 9 wherein:
aligning the vacuum securement head with the rigid tool comprises at least one process selected from the group consisting of:
  aligning a chevron at the vacuum securement head with a channel at the rigid tool;
  aligning a cone at the vacuum securement head with a cup at the rigid tool; and
  aligning a roller at the vacuum securement head with a stop at the rigid tool.

11. The method of claim 8 wherein:
the contour is defined by a strongback of the vacuum securement head.

12. The method of claim 8 further comprising:
enabling faces of the end effectors to float relative to a strongback of the vacuum securement head by releasing a lock, to facilitate alignment of the objects with troughs at the rigid tool.

13. The method of claim 8 further comprising:
pivoting the end effectors, in response to contact with the pickup tool, to align faces of the end effectors against the objects at the pickup tool.

14. The method of claim 8 further comprising:
applying negative pressure to a first portion of each of the end effectors to create the suction hold; and
applying negative pressure to a second portion of each of the end effectors to cause compaction.

15. The method of claim 8 wherein:
the method is performed according to instructions in a Numerical Control (NC) program.

16. A non-transitory computer readable medium embodying programmed instructions which, when executed by a processor, are operable for performing a method for picking up, placing, and compacting objects, the method comprising:
aligning end effectors of a vacuum securement head with objects disposed at a pickup tool, wherein the end effectors are arranged in a contour that is complementary to the pickup tool;
covering the objects with an impermeable membrane attached to the end effectors;
forming a suction hold that secures the objects to the vacuum securement head;
transporting the objects to a rigid tool while the suction hold is retained, wherein the rigid tool is complementary to the contour; and
compacting the objects to the rigid tool via suction applied at the vacuum securement head.

17. The medium of claim 16 wherein the method further comprises:
aligning the vacuum securement head with the rigid tool, prior to compacting the objects to the rigid tool.

18. The medium of claim 17 wherein:
aligning the vacuum securement head with the rigid tool comprises at least one process selected from the group consisting of:
  aligning a chevron at the vacuum securement head with a channel at the rigid tool;
  aligning a cone at the vacuum securement head with a cup at the rigid tool; and
  aligning a roller at the vacuum securement head with a stop at the rigid tool.

19. The medium of claim 16 wherein:
the contour is defined by a strongback of the vacuum securement head.

20. The medium of claim 16 wherein the method further comprises:
enabling faces of the end effectors to float relative to a strongback of the vacuum securement head by releasing a lock, to facilitate alignment of the objects with troughs at the rigid tool.

* * * * *